United States Patent [19]
Duval

[11] 3,747,230
[45] July 24, 1973

[54] TRAINING DEVICES
[75] Inventor: Bruce Duval, Nassau, Bahamas
[73] Assignee: T.P.I. Limited, Nassau, Bahamas
[22] Filed: Nov. 3, 1971
[21] Appl. No.: 195,245

[30] Foreign Application Priority Data
Nov. 6, 1970  Great Britain.................. 52,878/70

[52] U.S. Cl. .................................................. 35/11
[51] Int. Cl. ............................................. G09b 9/06
[58] Field of Search................... 35/11, 12 N, 12 W, 35/12 R; 272/16, 17, 18

[56] References Cited
UNITED STATES PATENTS
1,831,939  11/1931  White ................................ 35/12 N
3,471,943  10/1969  Waddington et al. ................. 35/11
2,208,083  7/1940   Rousseau .............................. 35/11
2,396,660  3/1946   Kanter ............................... 35/12 N
2,492,969  1/1950   Crane .............................. 35/12 N X Primary Examiner—Wm. H. Grieb
Attorney—Jacobs & Jacobs

[57] ABSTRACT

A simulator for teaching something of the art of sailing is provided in the form of a hull unit having a helm, a display device and means responsive to the helm to move the display device, or a display on the display device, to simulate changes of the heading of the hull in response to the helm. The display device may carry a permanently applied scene, movable therewith. The hull unit preferably has a power-driven heeling movement for the simulation of heeling in a supposed wind.

3 Claims, 3 Drawing Figures

PATENTED JUL 24 1973  3,747,230

Inventor
BRUCE DUVAL

By JACOBS + JACOBS
Attorneys

TRAINING DEVICES

The present invention relates to training devices and has as an object the provision of a training device in a new and improved form.

In accordance with the present invention there is provided a sailing simulator having a hull unit provided with a helm, a display device around the hull unit for the display of a scene around the hull unit and a drive responsive to the helm for moving the display around the hull unit to simulate changes of heading.

A scene applied to the display device, for example a scene permanently applied by painting or papering or a scene temporarily applied by chalk or crayon or affixing representations of landmarks and/or navigational features such as buoys or shipping, is conveyed around the hull unit, by the display device, in response to the helm.

With a simulator according to the invention, a pupil at the helm is given a visual impression similar in important respects to that experienced on operation of the helm under actual sailing conditions.

Actual sailing involves a heeling movement of the craft. It is possible to simulate the heeling movement by arranging for the scene to be tilted, but this is not considered to be as satisfactory as mounting the hull unit for heeling movement and providing powered heeling means for imparting the requisite heeling movements thereto.

Principles applicable to sailing simulators are described in our U.S. Pats. Nos. 3,471,943, 3,457,783, 3,540,134, 3,531,875 and 3,597,856.

These principles are applicable to a simulator as provided by the present invention when suitable allowance is made for the point that changes of heading are simulated by changes of scene rather than actually changing the heading of the hull unit.

Thus the hull unit may be mounted for and driven in heeling movement in bearings as in U.S. Pat. No. 3,471,943 or by supporting it buoyantly as in U.S. Pat. No. 3,597,856; the heeling may be controlled manually as in U.S. Pat. No. 3,471,943 or automatically as in U.S. Pat. No. 3,531,875; the boom may be controlled as in U.S. Pat. No. 3,540,134; and the helm, which is preferably a tiller, may be arranged as described in U.S. Pat. No. 3,597,856.

U.S. Pat. No. 3,457,783 describes an arrangement for generating a signal which represents the instantaneous direction of a supposed wind relative to the hull unit as the heading of the latter changes. The arrangement may be applied to a simulator of the present invention with appropriate modification, i.e. using the position of the scene rather than the position of the hull as an input.

By the present invention, the need to provide sturdy mechanical arrangements for changing the heading of the hull is avoided as also is the complication of providing fully rotational electrical connections.

The following description of a simulator according to the invention, in which description reference is made to the accompanying drawings, is given in order to illustrate the invention. In the drawings.

Figure 1:
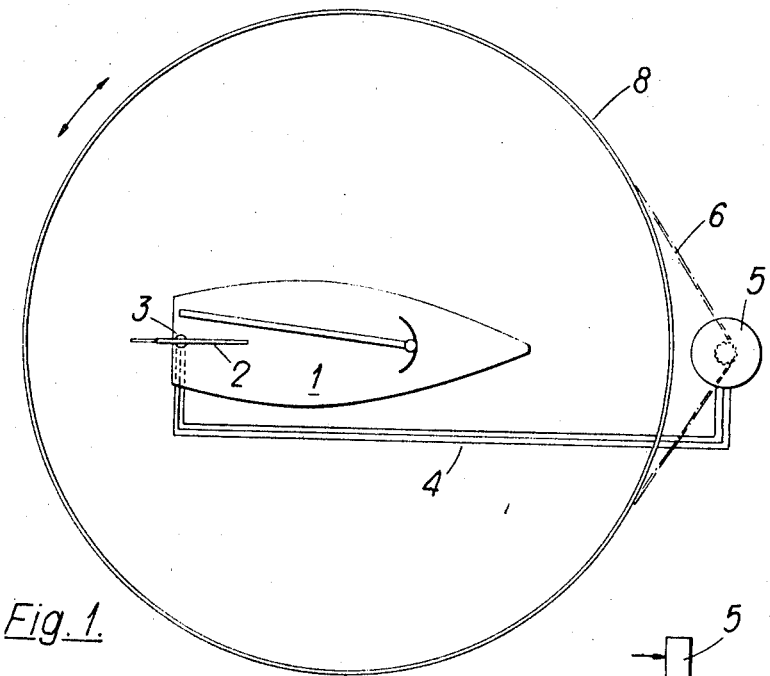
FIG. 1 is a horizontal cross-section, from just below ceiling level.
Figure 2:
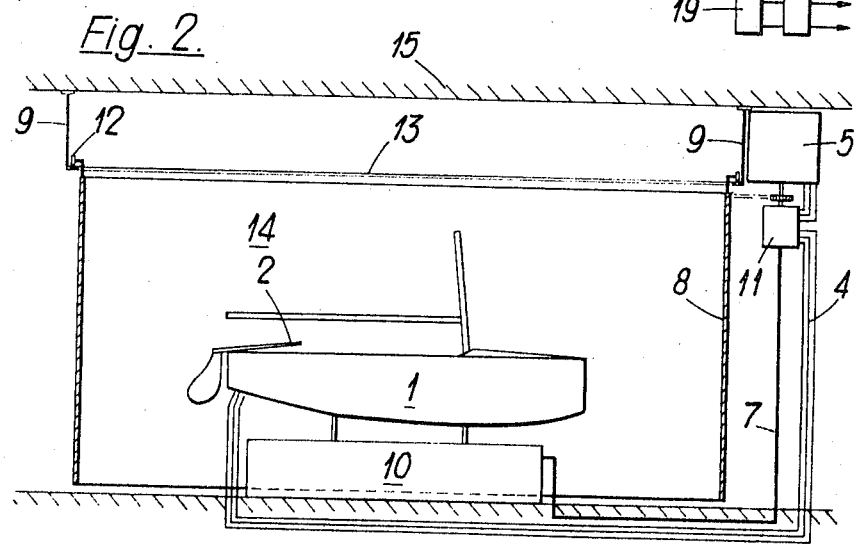
FIG. 2 is a side elevation with the panoramic cylinder shown in section.

Referring to FIGS. 1 and 2, the hull 1 is mounted on a base 10 which houses control equipment and bearings for the heeling movement of the hull 1.

The hull 1 having a mast, a boom and such controls as a main sheet, a fore sheet and centreboard tackle which are normally fitted to a sailing craft, has a tiller 2 connected to a sensor 3 which provides a balanced output at a predetermined zero position of the tiller 2 and a progressively changing output as the tiller 2 is moved either way from the zero position at which no turning effect is to be experienced.

The output signal from the sensor 3 is fed via connections 4 to a control unit 11 and thence to a servo power source such as a motor 5. The servo motor 5 is mechanically coupled to the cylindrical panorama 8 by a light chain 6 so that rotation of the motor 5 causes the panorama 8 to rotate in the same direction.

The panorama cylinder 8 conveniently of textile or other flexible material is suspended by small wheels 12 from a circular track 13 which is suspended from the ceiling 15 by a number of brackets such as that shown at 9.

The interior vertical wall 14 of the cylindrical panorama 8 is provided with appropriate seascapes, one feature of which, e.g. a hill, is applied around an entrance.

Figure 3:
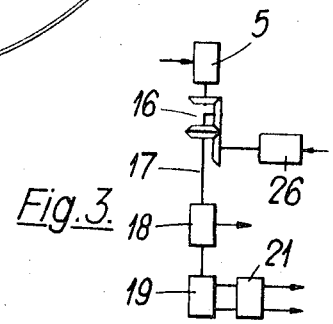
FIG. 3 is a block diagram of the wind direction resolving system showing the input from the rotation of the panoramic cylinder.

Referring to FIG. 3 the control unit 11 is shown in greater detail. The panorama drive servo motor 5 provides one of the two mechanical inputs to the wind direction resolver differential 16 which is similar to that described in U.S. Pat. No. 3,457,783. The second mechanical input to the differential 16 comes from a motor unit 26 and represents the direction of the imagined wind.

The output from the differential 16, which represents the direction of the wind relative to the hull, is connected via shaft 17 to a switching unit 18, a cam unit 19 which controls heeling, and a synchro-transmitter 21 which signals the wind direction to a boom following servo system such as that described in our specification No. 3,540,134. The switching unit 18 controls such functions as gybing and the modification of the steering response as the imagined wind changes from port to starboard — see U.S. Pat. No. 3,597,856.

The various inputs and outputs are carried by the multi-way cable 7 as shown in FIG. 2.

With a simulator in accordance with the present invention, a pupil is able to practice the manipulation of some at least of the controls of a sailing craft with awareness of at least some of the effects which they produce. Actual sailing involves sensing the various movements of the craft by inertial and other effects upon the body as well as visually. The results obtainable depend upon the degree of sophistication of the simulator. Useful progress may be made by a beginner who is given only the visual experience of his steering for different settings of the sail or sails. In practice a pupil who has experienced realistic effects of heeling, is well prepared for adaptation to actual sailing conditions even though he has become accustomed to only the visual effects of turning.

I claim:

1. A sailing simulator having a hull unit provided with a helm, an endless track, a display device disposed around the hull unit and suspended from said endless track for the display of a scene around the hull unit, and a drive responsive to the helm for moving the display of the scene around the endless track to simulate changes of heading of the hull unit.

2. A sailing simulator according to claim 1 in which the display device is formed of flexible material.

3. A sailing simulator according to claim 1 in which the hull is mounted for heeling movement and is provided with powered heeling means for imparting heeling movements thereto.

* * * * *